US010380605B2

(12) United States Patent
Groff et al.

(10) Patent No.: US 10,380,605 B2
(45) Date of Patent: Aug. 13, 2019

(54) SYSTEM AND METHOD FOR ASSOCIATING DISCOUNTS WITH PAYMENT OPTIONS

(75) Inventors: Jason Groff, Marietta, GA (US); Scott Mulcay, Cumming, GA (US)

(73) Assignee: NCR Corporation, Atlanta, GA (US)

( * ) Notice: Subject to any disclaimer, the term of this patent is extended or adjusted under 35 U.S.C. 154(b) by 98 days.

(21) Appl. No.: 13/495,530

(22) Filed: Jun. 13, 2012

(65) Prior Publication Data

US 2012/0323667 A1 Dec. 20, 2012

Related U.S. Application Data

(60) Provisional application No. 61/498,652, filed on Jun. 20, 2011.

(51) Int. Cl.
*G06Q 30/00* (2012.01)
*G06Q 30/02* (2012.01)
*G06Q 20/22* (2012.01)
*G06Q 20/38* (2012.01)

(52) U.S. Cl.
CPC .......... *G06Q 30/02* (2013.01); *G06Q 20/227* (2013.01); *G06Q 20/387* (2013.01)

(58) Field of Classification Search
None
See application file for complete search history.

(56) References Cited

U.S. PATENT DOCUMENTS

| | | | | |
|---|---|---|---|---|
| 6,070,156 | A * | 5/2000 | Hartsell, Jr. | 705/413 |
| 6,193,154 | B1 | 2/2001 | Phillips et al. | |
| 6,999,943 | B1 * | 2/2006 | Johnson et al. | 705/39 |
| 7,249,087 | B2 * | 7/2007 | Sharp et al. | 705/37 |
| 7,637,365 | B2 * | 12/2009 | Ringdahl et al. | 194/205 |
| 7,856,403 | B2 * | 12/2010 | Venturo et al. | 705/45 |
| 8,328,083 | B2 * | 12/2012 | Suk | 235/379 |
| 2002/0099610 | A1 * | 7/2002 | Marion | G06F 3/147 705/21 |
| 2005/0004839 | A1 * | 1/2005 | Bakker et al. | 705/14 |
| 2006/0155603 | A1 * | 7/2006 | Abendroth | G06Q 30/02 705/14.15 |
| 2006/0206385 | A1 * | 9/2006 | Walker | G06Q 20/202 705/21 |
| 2006/0271431 | A1 * | 11/2006 | Wehr et al. | 705/14 |
| 2007/0152038 | A1 * | 7/2007 | Ciancio | G06Q 30/0224 235/381 |
| 2008/0147539 | A1 * | 6/2008 | Robertson | 705/39 |
| 2009/0024466 | A1 * | 1/2009 | Shoemake | G06Q 30/00 705/14.38 |
| 2010/0082445 | A1 * | 4/2010 | Hodge et al. | 705/21 |

(Continued)

*Primary Examiner* — Meredith A Long

(74) *Attorney, Agent, or Firm* — Schwegman, Lundberg & Woessner

(57) ABSTRACT

Systems and methods for associating discounts or incentives with payment options are presented. In various embodiments, a customer purchasing goods or services is presented with various discounts or incentives to use one or more particular forms of payment such as cash, credit card, debit card, house card, or the like. After being presented with such information, the customer may then choose a form of payment, taking into account the various discounts or incentives related thereto. The appropriate discount or incentive is then applied to the customer's total bill and/or saved in the customer's loyalty account for future use.

19 Claims, 4 Drawing Sheets

(56) References Cited

U.S. PATENT DOCUMENTS

| | | | | |
|---|---|---|---|---|
| 2011/0184823 A1* | 7/2011 | Phillips | ............... | G06Q 20/206 |
| | | | | 705/18 |
| 2011/0307317 A1* | 12/2011 | Bortolin | ............... | G06Q 20/20 |
| | | | | 705/14.33 |
| 2012/0245988 A1* | 9/2012 | Pace | ............... | G06Q 30/0283 |
| | | | | 705/14.25 |
| 2012/0284105 A1* | 11/2012 | Li | ............... | 705/14.23 |
| 2014/0244409 A1* | 8/2014 | Nathanel | ............... | G06Q 50/12 |
| | | | | 705/15 |

\* cited by examiner

SYSTEM AND METHOD FOR ASSOCIATING DISCOUNTS WITH PAYMENT OPTIONS

CROSS-REFERENCE TO RELATED APPLICATIONS

This application claims priority to U.S. provisional application No. 61/498,652, filed Jun. 20, 2011, which is incorporated herein by reference.

BACKGROUND OF THE INVENTION

When a customer purchases goods or services from a retailer or other merchant, the merchant often presents the customer with a plurality of payment options. Such options may include, for example, payment by credit card, debit card, cash, check, electronic check, ACH (Automated Clearing House), loyalty card or system, EMV, house or local account or card, I.O.U., mobile device, and pay later system. Each payment option has a different cost associated with it that the merchant must bear if the merchant accepts the payment option. For example, for credit card transactions, the merchant must often pay the credit card processor a fixed percentage of the total purchase price and/or a flat fee in order to process payment using the customer's credit card. For purchase of gasoline using a credit card at the pump, the merchant must often pay a fixed-fee per gallon. As another example, an ACH transaction will have an associated cost with it that must be born by the merchant (and/or passed along to the merchant's customer). Even acceptance of cash by a merchant entails a certain cost, such as the costs to secure the currency, count and sort the currency, transport the currency to the bank, loss due to theft by employees or others, and buying charges.

SUMMARY OF THE INVENTION

In various embodiments of the present invention, a customer may select goods or services for purchase from the merchant and present the goods and/or services to the merchant for payment. The merchant uses a point of sale system to scan the goods or otherwise totalize the bill for the customer. The point of sale system then accesses a database to determine the costs associated with various forms of payment for the mix of goods and services selected by the customer. The point of sale system then presents one or more options for payment to the customer, including any discounts based on the form of payment. Based on that information, the customer may choose from the payment options according to his preference and his desire to obtain a discount. Preferably, the customer is incentivized to use a lower-cost form of payment (from the merchant's point of view) because the customer is offered a discount for using the lower-cost forms of payment.

DETAILED DESCRIPTION

Figure 1:
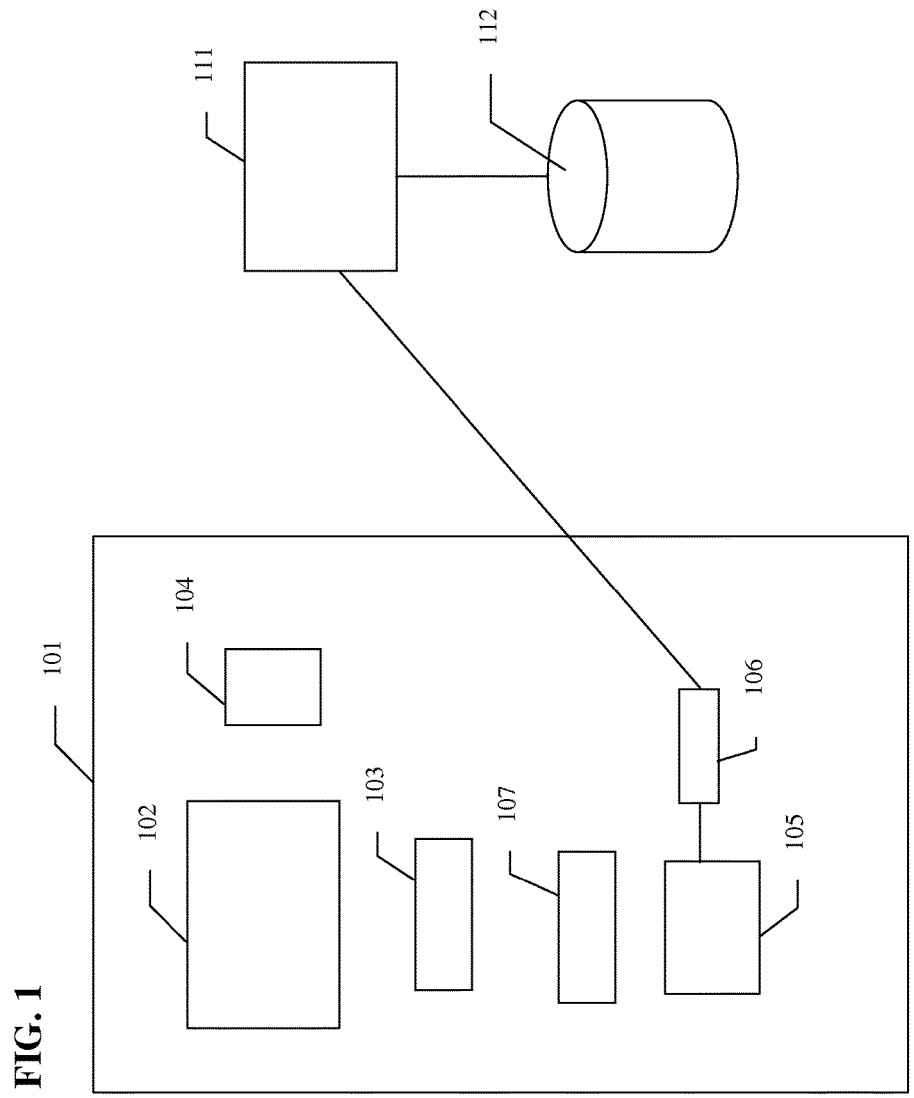
FIG. 1 is a diagram of a system in one embodiment of the invention.

FIG. 1 shows a system for associating discounts with payment options at a gas station or other fuel dispensing location in one embodiment of the invention. The system comprises a gas pump 101, a point of sale system 111, and a database 112. The gas pump 101 comprises a processor 105 capable of controlling the gas pump 101 and communicating with the point of sale system 111 using communications module 106. The gas pump 101 further comprises a display 102, an input device 103, and a personal identification number (PIN) pad 104, and a payment acceptor 107. The payment acceptor 107 may comprise a card reader capable of reading credit cards, debit cards, or the like. The payment acceptor 107 may also comprise a cash accepting device for receiving currency and/or coins. In some embodiments, the payment acceptor 107 may comprise a check validator device. In some embodiments, the payment acceptor 107 may comprise a device for accepting contactless payment forms such as contactless payment cards, RFID devices, BlueTooth devices such as phones or other mobile devices, or other tokens or objects capable of being identified for the purposes of payment. The processor 105 is preferably connected to display 102, input device 103, payment acceptor 107, PIN pad 104, and communications module 106.

The point of sale system 111 preferably comprises a system for scanning items and calculating a total price for the customer. The point of sale system 111 may comprise a self-service checkout system where the customer can scan items without the aid of a cashier. In other embodiments, the point of sale system 111 comprises a conventional cashier-assisted checkout system. The point of sale system 111 may be located wholly within the store or other retail establishment that operates the gas pump 101. In other embodiments, the point of sale system 111 may be partially or fully hosted at a remote site.

The point of sale system 111 preferably has access to a database 112 or other storage device. In some embodiments, the database 112 may be integrated into the point of sale system 111 itself. In other embodiments, the database 112 may be separate from the point of sale system 111. In yet other embodiments, the database 112 may be remotely located from the point of sale system 111.

Figure 3:
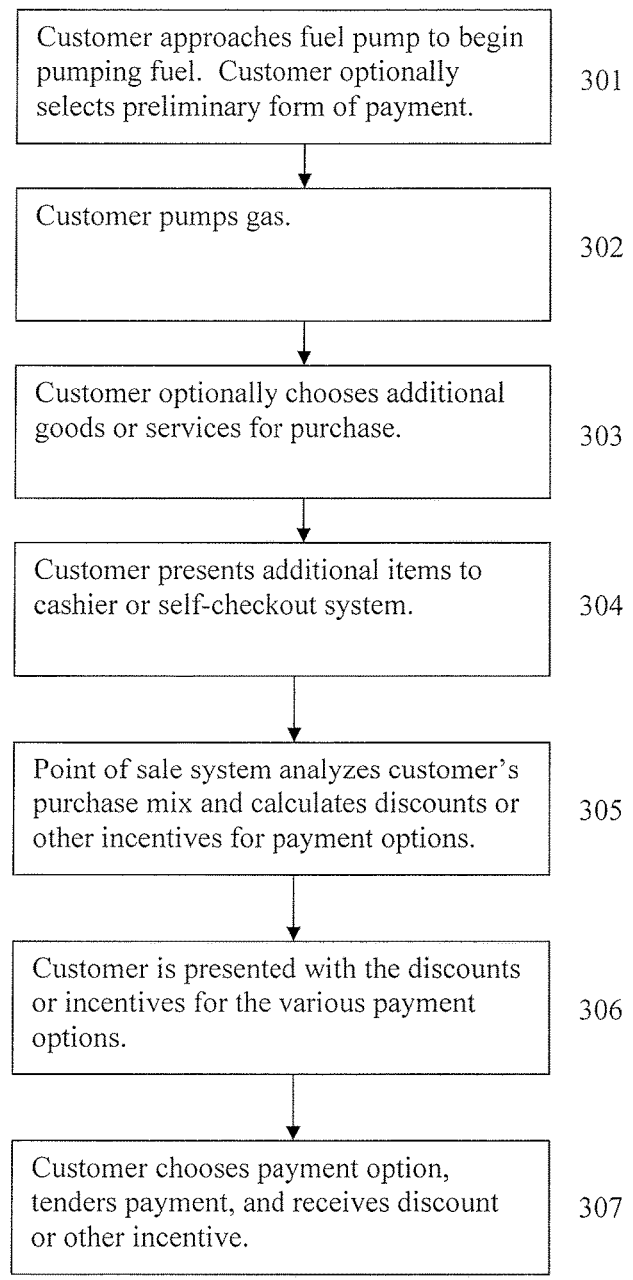
FIG. 3 is a flow diagram of a method for associating discounts with payment options in the system of FIG. 1.

Turning to FIG. 3, a flow diagram of a method for associating discounts with payment options is shown. At step 301, a customer approaches the gas pump 101 to purchase fuel. Optionally, the customer may select a preliminary form of payment. For example, the customer may swipe his credit card, debit card, membership card, pre-authorization card, or loyalty card through a card reader in the payment acceptor 107. Or the customer may insert cash into a cash accepting device in the payment acceptor 107. Alternatively, the customer may enter a pre-authorization code or other code on input device 103 to enable pumping of gas from gas pump 101. In some embodiments, the customer may enter other input on input device 103 such as the manual entry of an account number, a phone number, an identification number, a membership number (such as a loyalty membership number), a name, or other identifying information. Such manual entry of input on input device 103 may be in lieu of, or in addition to, the customer's interaction with payment acceptor 107. As an example, a customer may be required to enter a zip code on input device 103 after swiping a card through payment acceptor 107.

In another alternative, a clerk may enable the gas pump 101 to begin pumping. In yet another alternative, the gas pump 101 may be unlocked such that a customer can begin pumping fuel immediately upon approaching the gas pump 101 without receiving any form of authorization.

At step 302, the customer pumps gas or other fuel using gas pump 101.

At step 303, the customer goes inside the store and chooses additional goods or services for purchase. For example, the customer could choose food items, lottery tickets, or a car wash or other services. In some embodiments, the customer does not choose any additional goods or services apart from the fuel pumped from gas pump 101.

In some embodiments, the customer can choose to add additional items or services to his fuel bill while still at the gas pump 101. For example, display 102 could present the customer with an option to purchase a car wash for an additional fee. The customer could then use input device 103 to accept the offer and purchase the car wash.

In some embodiments, the customer can use his handheld device—such as a smart phone or tablet computer—to order additional items or services. For example, the customer could be presented with the option to purchase a car wash on his smart phone. The customer could then use the input device on his smart phone to accept or decline the offer for a car wash. In such embodiments, the smart phone would be in communication with the gas pump 101 and/or the point of sale system 111.

At step 304, the customer presents his additional items and/or requests additional items from the cashier at the point of sale system 111. For example, the customer could present the cashier with a food item and/or request to purchase a lottery ticket or a car wash. The customer preferably also discloses to the cashier the pump number of the gas pump 101 from which he has pumped gas or otherwise identifies the gas pump 101 so the cashier can add the additional items to his bill.

In some embodiments, the point of sale system 111 may comprise a self-checkout system and the customer will not need the assistance of a cashier. For example, the customer could identify his fuel transaction at the self-checkout system by entering a fuel pump number or swiping the credit card, debit card, or membership card previously used in step 301. The customer could then scan his additional items for purchase at the self-checkout system.

In some embodiments, the point of sale system 111 may comprise a mobile device such as the customer's own smartphone, tablet computer, laptop computer, or other mobile device. In such embodiments, the customer's mobile device may comprise a software application and/or may be in communication with a remote software application such that the mobile device is adapted to receive input for the purchases made by the customer. For example, the mobile device may be adapted to scan a bar code or a QR code to select a product for purchase. The mobile device may also be adapted to receive the manual entry of a code or other product identifier to select a product for purchase. The mobile device may preferably further be adapted to receive payment from the customer and/or access a mobile wallet.

At step 305, the point of sale system 111 will analyze the customer's mix of purchases and calculate discounts or other incentives for the customer. In this process, the point of sale system 111 may take into account the total amount for the overall purchase, the specific items purchased or combination of items purchased, the number of items (or specific types of items) purchased, the customer's loyalty membership (if any), payment promotions, discounts available, and payment type. For example, the point of sale system 111 may weigh the relative costs associated with particular brands of credit cards (i.e., determine the level of fees charged by the various credit card networks). The point of sale system 111 may also consider the relative fees/costs associated with contactless cards as compared to contact cards, swiped account numbers as compared to manually entered account numbers, and/or the prompting for a zip code (AVS) as compared to additional card information (such as CVV/CID).

Preferably, the point of sale system 111 will access database 112 in which are stored cost tables or cost information for the various types of payment options. The point of sale system 111 will then use this cost information to calculate a discount or other incentives for the customer based on the customer's purchase mix, purchase total, or other characteristics of the purchase.

As an example, the customer's purchase mix could include $20 of gasoline, $5 in lottery tickets, a car wash, and several grocery items. Based on this mix of purchases, the point of sale system 111 could determine that a credit card was the most costly form of payment to the merchant and therefore offer no discount for using a credit card. The point of sale system 111 could determine that a debit card was the second most costly form of payment and offer only a 5-cent per gallon discount on the gasoline purchase if a debit card were used. The point of sale system 111 could determine that cash or a house account was the cheapest form of payment and offer the customer a 10-cent per gallon discount on the gasoline purchase if cash or a house account were used.

In another example using the same purchase mix, the point of sale system 111 could rank the credit cards from various vendors, offering larger discounts to credit cards with lower fees. In addition or in the alternative, the point of sale system 111 could rank the credit cards based on manner of usage (such as contactless vs. contact cards, swiped account number entry vs. manual account number entry, and/or entry of zip code vs. entry of CVV/CID code for validation). Based on such information, the point of sale system 111 could rank the credit cards from most expensive to least expensive and give proportionally larger discounts to the credit cards with lower fees.

In some embodiments, the discount can be for a fixed amount off the total bill, e.g. $3 off the entire bill. In other embodiments the discount can be a percentage discount. In yet other embodiments, the discount can be a per-unit discount, e.g., 5-cents off per gallon of gasoline or 10-cents off per item of a given manufacturer. In some embodiments, the discount or incentive can be in the form of loyalty points or other loyalty incentives. In some embodiments, the discount or incentive from the current transaction can be combined with a discount or incentive from a past transaction and/or held in the customer's loyalty account or other account for use at a future date.

In some embodiments, the discounts can be fixed ahead of time and do not depend upon an analysis of the customer's purchase. In one embodiment, for example, credit card transactions could receive no discount while debit card or cash transactions always receive a 2% discount.

At step 306, the customer is presented with the discounts or incentives associated with the various payment options. This information can be presented via a display (not shown) on the point of sale system 111. Alternatively, the information could be conveyed verbally by a clerk operating the point of sale system 111. In another embodiment, the discount information can be presented to the customer using the display 102 of the gas pump 101. In yet another embodiment, the discount information can be presented to the customer on the customer's personal handheld device.

In some embodiments, the customer can pre-select the forms of payment which will be presented to him in order to narrow down the list of payment options. For example, a customer could indicate that he was only willing (or able) to pay using cash, a debit card, or a check. These preferences could be associated with the customer's loyalty account or house account, e.g. Alternatively, in some embodiments, the customer's handheld will maintain a list of all payment forms that the customer is willing to use. This list can be transmitted to the point of sale system 111 and/or the gas pump 101 to limit the payment options that are presented to the customer.

At step 307, the customer chooses a payment option from the choices presented to him. If he has not already done so, the customer will tender his form of payment to the cashier, the self-checkout system, or the payment acceptor 107. The point of sale system 111 will then apply the appropriate discount or credit the customer's loyalty account with the appropriate points.

Those skilled in the art will understand that this embodiment is illustrative and that many variations of the foregoing embodiment are contemplated. For example, the ordering of the aforementioned steps could be varied such that the customer begins his transaction in the store by selecting items for purchase and then completes his transaction at the gas pump 101. In some embodiments, the customer can complete his entire transaction at the gas pump 101 without entering the store. One such transaction could include solely purchasing gasoline at the gas pump 101. Another such transaction could include purchasing only gasoline and a car wash at the gas pump 101. The payment options for these transactions occurring solely at gas pump 101 could be presented to the customer on display 102. The customer could then use input device 103 to select the desired payment option from the list provided.

In some embodiments, the customer may perform the transaction partially or completely on a mobile device such as the customer's own smartphone, tablet computer, laptop computer, or other mobile device. As discussed above, such a mobile device may comprise a software application and/or may be in communication with a remote software application such that the mobile device is adapted to receive input for the purchases made by the customer and is further adapted to receive payment from the customer and/or access a mobile wallet.

Figure 2:
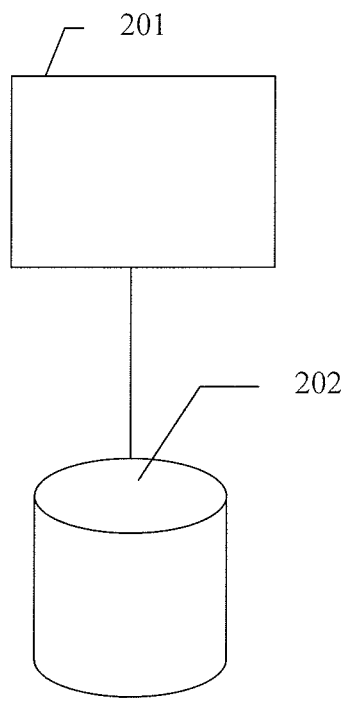
FIG. 2 is a diagram of a system in a second embodiment of the invention.

FIG. 2 shows a system for associating discounts with payment options at a store or retailer in a second embodiment of the invention. The system comprises a point of sale system 201 and a database 202 or other data storage device. In some embodiments, the point of sale system 201 may comprise a self-checkout system. In other embodiments, the point of sale system 201 may comprise a traditional clerk-assisted checkout system. In some embodiments, the point of sale system 201 may be adapted to communicate with customers' mobile devices such as smart phones, tablet computers, laptops, and the like. In some embodiments, the database 202 may be integrated into the point of sale system 201. In other embodiments, the database 202 may be located remotely from the point of sale system 201. In some embodiments, the point of sale system 201 may be partially or completely hosted at a location remote from the store. The database 202 preferably contains cost tables or cost information for the various types of payment options.

Figure 4:
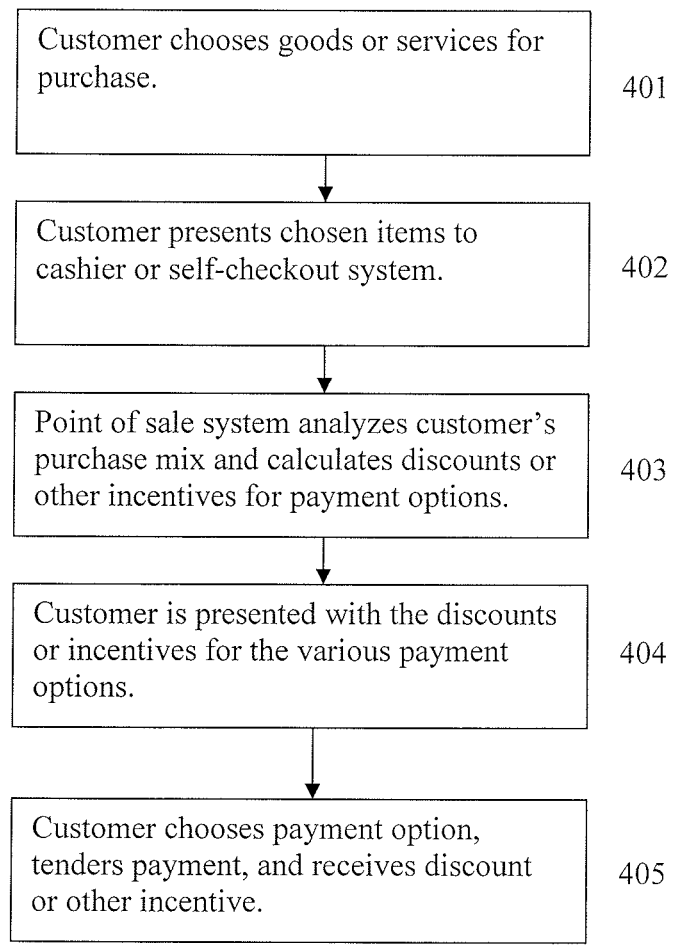
FIG. 4 is a flow diagram of a method for associating discounts with payment options in the system of FIG. 2.

Turning to FIG. 4, a flow diagram of a method for associating discounts with payment options is shown. At step 401, the customer chooses goods and/or services from the store.

At step 402, the customer approaches the point of sale system 201 and begins scanning his items. As discussed above, the point of sale system 201 may comprise a clerk-assisted checkout system in which the clerk could scan or itemize the customer's items. Alternatively, the point of sale system 201 may comprise a self-checkout system in which the customer could scan or itemize his own items.

At step 403, the point of sale system 201 will analyze the customer's mix of purchases and calculate discounts or other incentives for the customer. In this process, the point of sale system 201 may take into account the total amount for the overall purchase, the specific items purchased or combination of items purchased, the number of items (or specific types of items) purchased, the customer's loyalty membership (if any), payment promotions, discounts available, and payment type. For example, the point of sale system 201 may weigh the relative costs associated with particular brands of credit cards (i.e., determine the level of fees charged by the various credit card networks). The point of sale system 201 may also consider the relative fees/costs associated with contactless cards as compared to contact cards, swiped account numbers as compared to manually entered account numbers, and/or the prompting for a zip code (AVS) as compared to additional card information (such as CVV/CID).

Preferably, the point of sale system 201 will access database 202 in which are stored cost tables or cost information for the various types of payment options. The point of sale system 201 will then use this cost information to calculate a discount or other incentives for the customer based on the customer's purchase mix, purchase total, or other characteristics of the purchase.

For example, the customer's purchase could be for a total of $50 consisting of three items from one manufacturer and two items from another manufacturer. Based on this mix of purchases, the point of sale system 201 could determine that a credit card was the most costly form of payment to the merchant and therefore offer no discount for using a credit card. The point of sale system 201 could determine that a debit card was the second most costly form of payment and offer only a 2% discount if a debit card were used. The point of sale system 201 could determine that cash or a house account was the cheapest form of payment and offer the customer a 5% discount if cash or a house account were used.

In another example using the same purchase mix, the point of sale system 201 could rank the credit cards from various vendors, offering larger discounts to credit cards with lower fees. In addition or in the alternative, the point of sale system 201 could rank the credit cards based on manner of usage (such as contactless vs. contact cards, swiped account number entry vs. manual account number entry, and/or entry of zip code vs. entry of CVV/CID code for validation). Based on such information, the point of sale system 201 could rank the credit cards from most expensive to least expensive and give proportionally larger discounts to the credit cards with lower fees.

In some embodiments, the discount can be for a fixed amount off the total bill, e.g. $5 off the entire bill. In other embodiments the discount can be a percentage discount. In yet other embodiments, the discount can be a per-unit discount, e.g., 20-cents off per item of a given manufacturer. In some embodiments, the discount or incentive can be in the form of loyalty points or other loyalty incentives. In some embodiments, the discount or incentive from the current transaction can be combined with a discount or incentive from a past transaction and/or held in the customer's loyalty account or other account for use at a future date.

In some embodiments, the discounts can be fixed ahead of time and do not depend upon an analysis of the customer's purchase. In one embodiment, for example, credit card transactions could receive no discount while debit card or cash transactions always receive a 3% discount.

At step 404, the customer is presented with the discounts or incentives associated with the various payment options. This information can be presented via a display (not shown) on the point of sale system 201. Alternatively, the information could be conveyed verbally by a clerk operating the point of sale system 201. In another embodiment, the discount information can be presented to the customer on the customer's personal handheld device.

In some embodiments, the customer can pre-select the forms of payment which will be presented to him in order to narrow down the list of payment options. For example, a customer could indicate that he was only willing (or able) to pay using cash or a credit card. These preferences could be associated with the customer's loyalty account or house account, e.g. Alternatively, in some embodiments, the customer's handheld will maintain a list of all payment forms that the customer is willing to use. This list can be transmitted to the point of sale system 201 to limit the payment options that are presented to the customer.

At step 405, the customer chooses a payment option from the choices presented to him. If he has not already done so, the customer will tender his form of payment to the cashier or the self-checkout point of sale system 201. The point of sale system 201 will then apply the appropriate discount or credit the customer's loyalty account with the appropriate points.

In some embodiments, the point of sale system 201 may comprise a mobile device such as the customer's own smartphone, tablet computer, laptop computer, or other mobile device. In such embodiments, the customer's mobile device may comprise a software application and/or may be in communication with a remote software application such that the mobile device is adapted to receive input for the purchases made by the customer. For example, the mobile device may be adapted to scan a bar code or a QR code to select a product for purchase. The mobile device may also be adapted to receive the manual entry of a code or other product identifier to select a product for purchase. The mobile device may preferably further be adapted to receive payment from the customer and/or access a mobile wallet.

Accordingly, while the invention has been described with reference to the structures and processes disclosed, it is not confined to the details set forth, but is intended to cover such modifications or changes as may fall within the scope of the following claims.

What is claimed is:

1. A method for associating discounts with payment options for a transaction of a customer through operation of a fuel pump, the method implemented as software residing in non-transitory computer-readable storage media of the fuel pump and a separate point of sale (POS) system, the software executed by processors of the fuel pump and the POS system, the method comprising:
   a) receiving, by the software executing on at least one processor of the fuel pump, a preliminary form of payment from the customer to initiate the transaction, wherein the customer is operating the fuel pump;
   b) causing, by the software of the fuel pump, pumping of fuel from the fuel pump at direction of said customer;
   c) receiving, by the software executing on at least one processor of the POS system that is separate from the fuel pump, additional items for purchase from said customer through the initiated transaction that is in addition to the fuel being purchased by the customer;
   d) determining, by the software of the POS system, one or more discounts associated with multiple forms of payment and based at least in part on a purchase mix of the additional items including the fuel, wherein determining further includes accounting for the purchase mix as: i) a total amount for purchase, ii) specific items purchased or a combination of items purchased, iii) a total number of items or specific types of items purchased, iv) a loyalty level for the customer, payment promotions, v) discounts available, vi) a specific payment type, and vii) a manner of using specific payment types selected from: a contactless payment card, a contact payment card, a swiped account card, and an account keypad entry, and wherein determining further includes obtaining, by the software of the POS system, the multiple forms of payment as a broadcast from a mobile device of the customer that identifies customer forms of payments for the customer;
   e) presenting, by the software of the POS system, specific ones of the one or more discounts associated with each of the multiple forms of payment based on the processing of (d) to said customer before the customer provides a customer-selected form of payment from the multiple forms of payment, wherein presenting further includes providing the specific ones of the one or more discounts and each of the associated multiple forms of payment to the mobile device for selection by the customer on the mobile device;
   f) receiving, by the software of the POS system, the customer-selected form of payment from said customer through communication with the mobile device;
   g) applying, by the software of the POS system, the discount associated with the customer-selected form of payment and thereby associating the discount with the customer-selected form of payment for the transaction during operation of the fuel pump by the customer, and wherein applying further includes applying the discount based on the purchase mix; and
   h) presenting, by the software of the POS system, an option for the customer to select in order to receive the discount on a subsequent transaction associated with the customer.

2. The method of claim 1 wherein step (d) comprises associating relatively smaller discounts with forms of payment that are relatively costly to a merchant in operation of said fuel pump.

3. The method of claim 1 wherein the fuel pump comprises a card reader and the preliminary form of payment is selected from the group consisting of: credit card, debit card, loyalty card, membership card, and house account card.

4. The method of claim 1 wherein the fuel pump comprises a cash accepting device and the preliminary form of payment comprises cash.

5. The method of claim 1 wherein the POS system comprises a self-checkout system.

6. The method of claim 1 further comprising the step of receiving, by said POS, a pre-selection of the forms of payment associated with the customer; wherein the customer is only presented with the pre-selected forms of payment in step (e).

7. The method of claim 1 wherein step (g) further comprises combining the discount associated with the payment received in step (f) to a previously earned discount by the customer.

8. The method of claim 1 wherein step (g) comprises saving the discount associated with the payment received in step (f) in a loyalty account associated with the customer.

9. A method for associating discounts with payment options for a customer through operation of a fuel pump, the method implemented as software residing in non-transitory computer-readable storage media of the fuel pump and a separate point of sale (POS) system, the software executed by processors of the fuel pump and the POS system, the method comprising:
  a) receiving, by the software executing on at least one processor of the fuel pump, a preliminary form of payment from the customer;
  b) causing, by the software of the fuel pump, pumping of fuel from the fuel pump at direction of said customer;
  c) receiving, by the software of the fuel pump, selections of additional items for purchase from said customer operating the fuel pump that are in addition to the fuel being purchased by the customer;
  d) determining, by the software executing on at least one processor of the POS system one or more discounts associated with multiple forms of payment, wherein at least one of the discounts associated with the multiple forms of payment comprises a discount based on a purchase mix of the additional items and the fuel, wherein determining further includes accounting for the purchase mix as: i) a total amount for purchase, ii) specific items purchased or a combination of items purchased, iii) a total number of items or specific types of items purchased, iv) a loyalty level for the customer, payment promotions, v) discounts available, vi) a specific payment type, and vii) a manner of using specific payment types selected from: a contactless payment card, a contact payment card, a swiped account card, and an account keypad entry, and wherein determining further includes obtaining, by the software of the POS system, the multiple forms of payment as a broadcast from a mobile device of the customer that identifies customer forms of payments for the customer;
  e) presenting, by the software of the fuel pump, to said customer specific ones of the one or more discounts associated each of the multiple forms of payment based on the processing in (d) to said customer before the customer provides a customer-selected form of payment from the multiple forms of payment, wherein presenting further includes providing the specific ones of the one or more discounts and each of the associated multiple forms of payment to the mobile device for selection by the customer on the mobile device;
  f) receiving, by the software of the fuel pump, the customer-selected form of payment from said customer through communication with the mobile device;
  g) applying, by the software of the POS system, the discount associated with the customer-selected form of payment and thereby associating the discount with the customer-selected form of payment during operation of the fuel pump by the customer and wherein applying further includes applying the discount based on the purchase mix; and
  presenting, by the software of the POS system, an option for the customer to select in order to receive the discount on a subsequent transaction associated with the customer.

10. The method of claim 9 wherein step (d) comprises associating relatively smaller discounts with forms of payment that are relatively costly to a merchant in operation of said fuel pump.

11. The method of claim 9 wherein said fuel pump comprises said POS system.

12. The method of claim 9 wherein step (c) comprises receiving a signal from the mobile device associated with the customer, wherein the signal comprises said selections of additional items for purchase.

13. The method of claim 9 wherein step (g) further comprises combining the discount associated with the payment received in step (f) to a previously earned discount by the customer.

14. The method of claim 9 wherein step (g) comprises saving the discount associated with the payment received in step (f) in a loyalty account associated with the customer.

15. A method for associating discounts with payment options for a customer, the method implemented as software residing on a non-transitory computer-readable storage medium and the software executed by at least one processor of point of sale (POS) system, the method comprising:
  a) receiving, by the software executing on the at least one processor of the POS, items for purchase from said customer;
  b) determining, by the software, one or more discounts associated with multiple forms of payment and based at least in part on a purchase mix for the items, wherein determining further includes accounting for the purchase mix as: i) a total amount for purchase, ii) specific items purchased or a combination of items purchased, iii) a total number of items or specific types of items purchased, iv) a loyalty level for the customer, payment promotions, v) discounts available, vi) a specific payment type, and vii) a manner of using specific payment types selected from: a contactless payment card, a contact payment card, a swiped account card, and an account keypad entry, and wherein determining further includes obtaining, by the software, the multiple forms of payment as a broadcast from a mobile device of the customer that identifies customer forms of payments for the customer;
  c) presenting, by the software, specific ones of the one or more discounts associated with multiple forms of payment determined based on the processing in (b) to said customer before the customer provides a customer-selected form of payment from the multiple forms of payment, wherein presenting further includes providing the specific ones of the one or more discounts and each of the associated multiple forms of payment to the mobile device for selection by the customer on the mobile device;
  d) receiving, by the software, a customer-selected form of payment from said customer through communication with the mobile device;
  e) applying, by the software, the discount associated with the customer-selected form of payment and thereby associating the discount with the customer-selected form of payment provided at the direction of the customer and wherein applying further includes applying the discount based on the purchase mix; and
  f) presenting, by the software, an option for the customer to select in order to receive the discount on a subsequent transaction associated with the customer.

16. The method of claim 15 wherein step (b) comprises associating relatively smaller discounts with forms of payment that are relatively costly to a merchant in operation of said POS system.

17. A system for associating discounts with payment options for a customer, the system comprising:
  a) a fuel pump, the fuel pump comprising:
    i) a display,
    ii) an input device, iii) a payment acceptor implemented as software residing in a non-transitory computer-readable storage medium, the processor configured to execute the payment acceptor from the non-transitory computer-readable storage medium, iv) a processor, and v) a communications module configured to provide communications between the fuel pump and a point of sale (POS) system; and b) the POS system including at least one hardware processor that is configured to execute software residing in a non-transitory computer-readable storage medium of the POS system;

wherein the payment acceptor is configured to receive a preliminary form of payment from the customer;

wherein the POS system is configured to receive selections of items for purchase from said customer;

wherein the POS system is configured to determine one or more discounts associated with each of multiple forms of payment, wherein at least one discount is based at least in part on a purchase mix for the items, receive the multiple forms of payment as a broadcast from a mobile device of the customer as customer forms of payment, and wherein the POS system is further configured to account for the purchase mix as: i) a total amount for purchase, ii) specific items purchased or a combination of items purchased, iii) a total number of items or specific types of items purchased, iv) a loyalty level for the customer, payment promotions, v) discounts available, vi) a specific payment type and vii) a manner of using specific payment types selected from: a contactless payment card, a contact payment card, a swiped account card, and an account keypad entry;

wherein the display is configured to display said one or more discounts associated with each of the multiple forms of payment to the customer before the customer provides a customer-selected form of payment;

wherein the payment acceptor is configured to receive customer-selected form payment from the customer; and wherein the POS is configured to apply the discount associated with the customer-selected form of payment to thereby associate the discount with the customer-selected form of payment during operation of the fuel pump by the customer and wherein the POS is further configured to apply the discount based on the purchase mix, and wherein the processor is further configured to present on the display an option for the customer to select in order to receive the discount on a subsequent transaction associated with the customer.

18. The system of claim 17 wherein the point of sale system is configured to associate relatively smaller discounts with forms of payment that are relatively costly to a merchant in operation of said POS system.

19. The method of claim 17 wherein the POS system is configured to receive a pre-selection of the forms of payment associated with the customer; and wherein only the pre-selected forms of payment are displayed to the customer via the display of the fuel pump.

* * * * *